Oct. 2, 1962

J. E. GARY ETAL 3,056,182

WINDLACE

Filed June 15, 1959

INVENTORS
John E. Gary and
Cyril A. Cobb

BY Stevens, Davis, Miller & Mosher
ATTORNEYS

Oct. 2, 1962  J. E. GARY ETAL  3,056,182
WINDLACE
Filed June 15, 1959  2 Sheets-Sheet 2
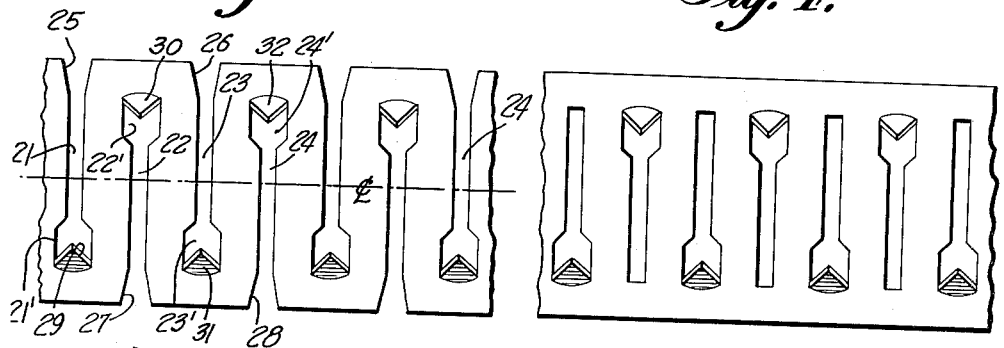
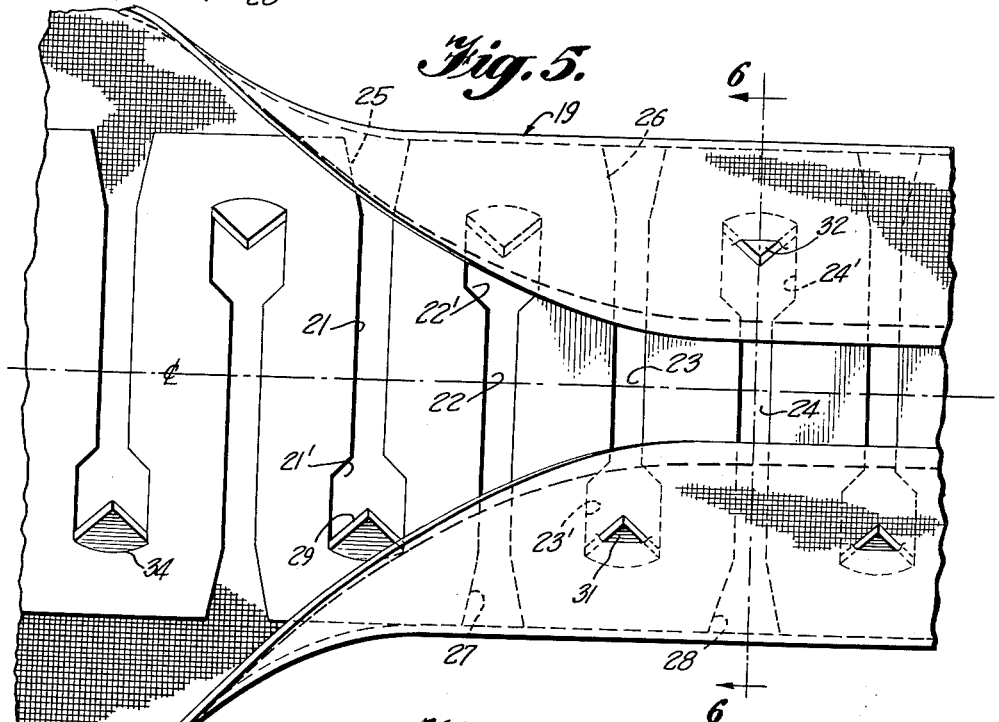
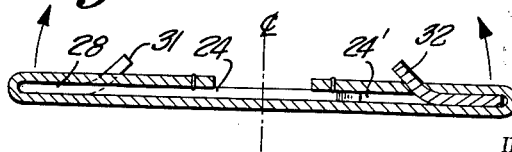
INVENTORS
John E. Gary and
Cyril A. Cobb
BY Stevens, Davis, Miller & Mosher
ATTORNEYS

United States Patent Office 3,056,182
Patented Oct. 2, 1962

3,056,182
WINDLACE
John E. Gary, Weston, Conn., and Cyril A. Cobb, Renfrew, Ontario, Canada, assignors to Republic Industrial Corporation, New York, N.Y., a corporation of Delaware
Filed June 15, 1959, Ser. No. 820,242
4 Claims. (Cl. 24—259)

This invention relates to beading and molding and more particularly to material known as windlace, weather strip, draft excluding strip and the like of the type that is disposed around the door frame of a vehicle for either or both of sealing and ornamental purposes.

In the weather stripping of an automobile door there are essentially two problems; sealing against drafts and water leakage around the door and providing an internal door trim of attractive appearance which is capable of hiding minor misalignments between door and frame. In either or both cases the door frame may be made with a flange the purpose of which is to provide a permanent, stable support for the weather stripping, decorative beading or the like.

To achieve the stability and strength advantages of the flange type of weather strip support without disproportionate increase in cost it is essential that the weather strip or windlace be of simple construction, capable of easy and rapid application and yet possessed of great durability once in its position of use.

It is an object of the present invention to achieve the foregoing and to provide a clip succeeding lengths of which may be pressed onto a door frame flange with great ease but once in position will resist removal with great permanence.

It is a further object of the present invention to provide a clip of great longitudinal flexibility to fit neatly and well around door frame corners, of excellent adaptability to flanges of different or variable widths and of broad suitability for supporting all sorts of weather stripping material of natural or synthetic fibers, plastics and natural and synthetic rubber.

Other objects and advantages of this invention will be apparent from the following detailed description of several embodiments thereof in conjunction with the annexed drawings wherein:

FIGURE 3 is a plan view of a blank from which the clip of the present invention may be formed;

FIGURE 4 is a view similar to FIGURE 3 but showing a blank used in forming a modified type of clip;

FIGURE 5 is a view of the blank of FIGURE 3 to an enlarged scale showing the application of the covering material thereto;

FIGURE 6 is a view in section taken on the line 6—6 of FIGURE 5; and

Figure 1:
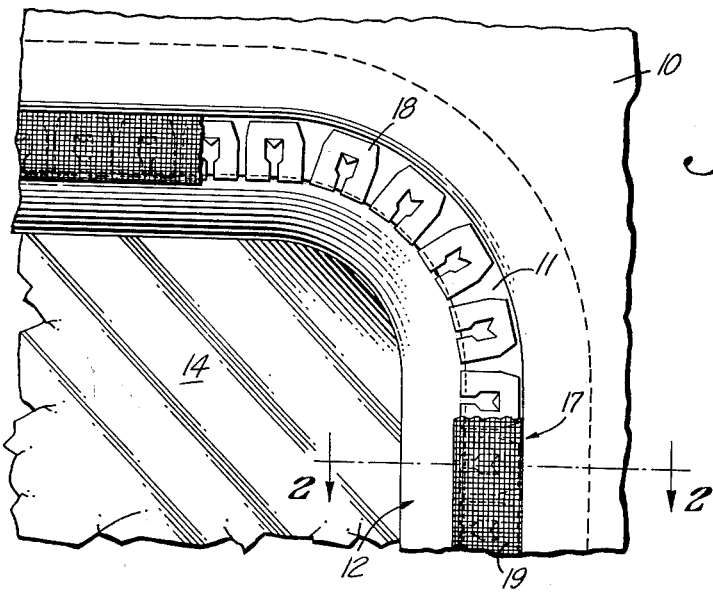
FIGURE 1 is a fragmentary view of an automobile door frame, as viewed from inside the vehicle, showing in its position of use a length of clip made according to the teachings of the present invention, the covering decorative material being illustrated as partially removed better to show the position which the clip occupies when it is on the flange.
Figure 2:
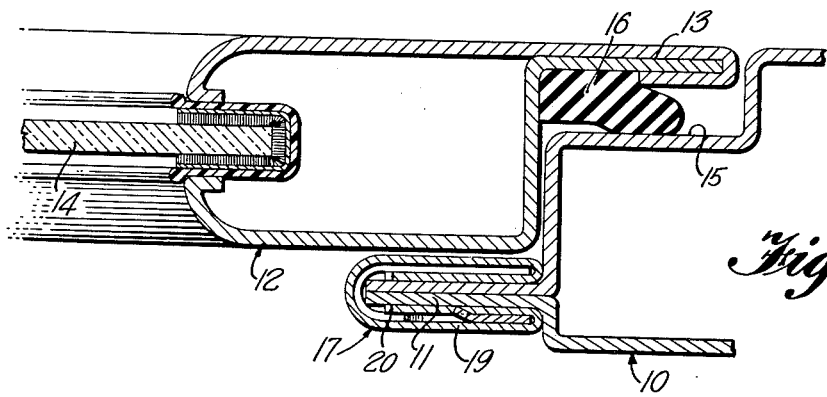
FIGURE 2 is a view in cross section taken on the line 2—2 of FIGURE 1.

In FIGURE 1 of the drawing, there is shown a typical door and door frame construction of the type to which the present invention is applicable. In FIGURES 1 and 2 of the drawings, the numeral 10 designates a portion of the interior of a motor vehicle body. This body is provided with a flange 11 which marginally surrounds the door opening. Within this opening there is located a door 12 having a flange 13 thereon. The door 12 is provided with a transparent window at 14. The body 10 has an inset portion at 15 registering with the flange 13 of the door 12. Between the flange 13 and the portion 15 there is located a resilient sealing strip 16.

On the interior of the vehicle the flange 11 projects beyond the crack between the door and the door frame and this crack is decoratively covered by windlace 17 constructed and applied in accordance with the teachings of the present invention. The windlace 17 consists of two basic elements, a running length of clip 18 and a fabric covering material 19 of a color and texture artistically compatible with the interior trim of the vehicle. One fabric material which has been used and which has been illustrated in FIGURES 1 and 2 is a woven polyethylene material with an edging of cotton which is shown at 20 in FIGURE 2 and elsewhere in the drawings.

If now reference is made to FIGURE 3, one can acquire a more complete understanding of the structure of the clip 18. FIGURE 3 represents the blank from which the clip 18 is formed. The blank is an elongated piece of sheet metal characterized by longitudinally spaced slots some of which are designated numerals for further reference. Slots 21, 22, 23 and 24 are in this category. The slots 21 and 23 have mouths 25 and 26 that lie at an edge of the blank. Slots 22 and 24 have mouths 27 and 28 respectively which originate at the opposite edge of the blank from the mouths 25 and 26 and this arrangement of adjacent slots such as 21 and 22 having their mouths originating at opposite edges of the blank continues throughout the length of the blank. At the end of each slot opposite its mouth there is an enlarged portion. In the slots to which reference numerals have been applied, these enlarged portions are designated 21', 22', 23' and 24'. Within the enlarged portions such as 21' there protrude tangs such as 29, 30, 31 and 32. In FIGURE 5 the clip blank of FIGURE 3 is shown to an enlarged scale. The tangs 29, 30, 31 and 32 extend upwardly toward the viewer as they are shown in FIGURES 3 and 5, that is in looking at FIGURES 3 and 5 the point of the tang is the nearest part of the clip to the eye of the viewer. Since the tangs ultimately face each other in the finished clip, it can be seen that the side of the blank which is uppermost in FIGURES 3 and 5 may be correctly referred to as the interior of the clip of the blank while the part away from the viewer, which will become the outside of the clip, can be designated as the outer side. The woven material may have its folded-over edges fastened to the clip blank by an adhesive applied to marginal zones of the inside face of the clip, zones along the long edges of the fabric or both. Additionally, the folding over of the fabric causes at least some of the tangs to penetrate it and they assist in holding the fabric material in position.

Figure 7:
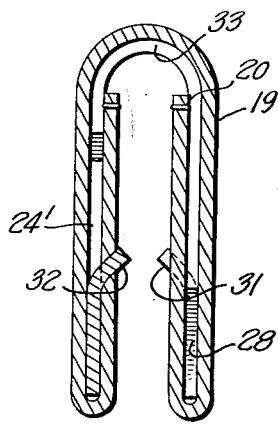
FIGURE 7 is an end view of the clip formed by bending the covered blank of FIGURE 5 into generally U-shaped cross section.

After the fabric has been folded over the blank as shown in FIGURE 5, the blank is then bent into U section as shown in FIGURE 7. It then has a center bight 33 and shanks extending from opposite sides of it. In FIGURE 6, the arrows designate the direction of the bend. The center line symbol in FIGURES 3, 5 and 6 designates the long axis of the blank along which the bending occurs to produce the center bight 33.

Bending the blank along the center line has a tendency to tighten the fabric on the outside of the clip. The reason for this is apparent upon concurrent analysis of FIGURES 5, 6 and 7. The tangs are generally triangular in shape with a base line 34 generally parallel to the edge of the clip and the apex pointing inwardly and toward the bight. Furthermore, the tangs are located in the enlarged portions at the end of each slot and their respective bases are normal to the direction of the pull exerted in the fabric during the forming of the bight 33. This action causes the fabric to impale itself more deeply over each tang. This tendency when transmitted to the material has the effect of producing a smooth exterior surface of the windlace making it an attractive adjunct to the decor of the vehicle. The finished windlace, having the appearance best illustrated in FIGURE 7, is applied around the door frame of the door by simply pushing the opposite shanks of the clip into straddling relation with respect to the door flange 20. Succeeding lengths of the windlace are pushed over the flange until the trim of the door is complete. The tangs, by reason of their inward and upward slope, do not resist movement of the legs or shanks of the clip into straddling relation with the flange, but their sharp points strongly resist withdrawal of the shanks from the flange straddling relationship once it is established. Thus, the windlace of the present invention is very easy to install but once installed has a high degree of permanence.

In the form of the invention illustrated in FIGURE 7, the space between the points of the tangs in the repose position of the clips is somewhat less than the width of the flange 11. Therefore, when the clip is applied over the flange, the tangs are resiliently biased toward a new position somewhat closer to parallel to the shanks than that which they occupied in their position in response. A certain amount of resilient loading of the bight likewise occurs and the energy stored in elastic deformation is exerted through the points of the tangs against opposite sides of the flange.

If reference is again made to FIGURE 3, it will be noted that the point of each tang lies closer to an edge of the blank than it does to the center line of the bight. For this reason, the clip of the present invention is admirably suited to a considerable variety of flange widths without requiring any variation in construction. If the flange is narrower than the dimension for which the clip is designed, the legs or shanks of the clip are brought closer together when the windlace is installed. On the other hand, if the tangs are close to the edge, as is the case in the present invention, their angle of attack and effectiveness with the flange is not impaired by minor differences in the spacing of the shanks.

Of course, the transverse slots with the mouths of adjacent slots originating on opposite sides of the clip is for the purpose of giving the clip a high degree of longitudinal flexibility to fit around corners, one of which is illustrated in FIGURE 1. One of the problems of this art is the achievement of adequate flexibility while maintaining adequate mechanical strength. The present design is characterized by the fact that a plane normal to its long axis or center line may pass between adjacent slots without intersecting either. Another way of saying this is to describe the slots as so spaced longitudinally that a transverse projection of even the widest part of one slot will not overlap a similar projection of the adjacent slot.

If the base line 34 of a typical tang is studied in detail, it will be noted that while it is generally parallel to the edge of the blank, see FIGURE 5, it is actually curved. The reason for this is that the tangs of the present invention are not just bent out of the plane of the blank but are bodily or individually swaged or otherwise cold worked. In other words, if a tang were merely bent out from a blank, the cold working of the tang would exceed that of the blank only at the bend. In the present invention the entire body of the tang is subject to a blow which modifies its configuration and cold works it to a degree above the level of cold working to which the blank has been subjected. In the illustrated form of the invention the tank has a surface which is bent along an axis parallel to a plane normal to the center line of the clip.

Since the tangs of the clip of the present invention are cold worked more than the rest of the clip, there is a tendency to transmit resilient deformation that results in applying the clip to a flange to the center bight. This has been found to promote good holding properties.

In many installations the degree of flexibility of the clip can be made adequate without the slots extending through the edges of a blank. Such an arrangement as this is shown in FIGURE 4 which except for the fact that the slots terminate short of the edge of a blank is in other respects the same as FIGURE 3. The FIGURE 4 construction is somewhat stronger and somewhat less flexible which suggests its use where the gauge of the metal is lighter or where angles of bend are less severe.

In order that the precise ratio between the various parts of the clip of the present invention can be fully understood, FIGURE 1 of the drawings has been made to scale and the other figures are proportionate enlargements. In the preferred embodiment of the invention the blank such as that shown in FIGURE 3 is from .015″ to .022 thick. The slots from the edge of the base line 34 to the opposite edge of the blank are $13/16''$ long. In other words, the slot from its mouth to its bottom is $13/16''$ long, the width of the blank is $61/64''$ and the slots are $1/16''$ wide at the center line of the blank and $1/8''$ wide at the area at which the tang registers. The tangs project above the plane of the blank .063 of an inch. The blank of FIGURE 3 provides a transverse portion between adjacent slots which is uninterrupted from edge to edge and which is $1/8''$ wide. Due to staggering of the adjacent slots, the actual width of metal is at least $1/4''$ between the adjacent edges of each.

We claim:

1. A device of the type used to attach lengths of sealing material to a flange marginal to an opening that comprises an elongated metal clip having shanks extending from opposite sides of a bight, said clip having a plurality of longitudinally spaced, transversely extending slots, adjacent slots having their mouths at opposite edges of said clip, each slot having at its end opposite its mouth a symmetrically widened portion, a tang positioned in said widened portion, its point extending between said shanks toward said bight midway between the sides of its slot and positioned closer to an edge of the clip than it is to the center of the bight.

2. A device of the type used to attach lengths of sealing material to a flange marginal to an opening that comprises an elongated metal clip having shanks extending from opposite sides of a bight, said clip having a plurality of longitudinally spaced slots each extending transversely thereof, adjacent slots originating in opposite shanks of said clip and each terminating in a widened open portion, a generally triangular tang symmetrically positioned in said open portion, each tang being located on the opposite shank from the shank of origin of the respective slot so that said tangs are alternately disposed along the length of said clip on opposite sides of said bight and are evenly longitudinally spaced one from another, the points of said tangs extending inwardly and toward said bight, the metal of each tang being cold worked more than the metal of the remainder of the clip.

3. A device of the type used to attach lengths of sealing material to a flange marginal to an opening that comprises an elongated metal clip generally U-shaped in cross section, said clip having a plurality of longitudinally spaced slots, adjacent slots having their mouths at opposite edges of said clip, the mouths of said slots being widened by diverging edges extending a substantial distance inwardly toward the bight, each slot having at its end opposite its mouth a symmetrically widened portion, a substantially triangular tang positioned at said portion, and having an inwardly and upwardly extending point, each tang being curved slightly from its base to its point about an axis sloping toward the bight of the clip, said axis lying in a plane midway of the sides of the slot in which the tang is positioned.

4. A device of the type used to attach lengths of sealing material to a flange marginal to an opening that comprises an elongated metal clip generally U-shaped in cross section, said clip having a plurality of longitudinally spaced slots extending transversely thereof, adjacent slots originating at opposite edges of said clip and each having an open throat and terminating in a symmetrically widened portion, a triangular tang medially positioned in said widened portion and having an inwardly and upwardly extending point, and each slot having its adjacent edges diverging outwardly from a point a considerable distance inwardly from the edges of the clip to permit greater flexing of the clip in a direction tending to cause the adjacent edges of the slots to be moved toward each other at the throat portion.

References Cited in the file of this patent

UNITED STATES PATENTS

| | | |
|---|---|---|
| 2,295,444 | Woodward | Sept. 8, 1942 |
| 2,693,011 | Fernberg | Nov. 2, 1954 |
| 2,699,581 | Schlegel | Jan. 18, 1955 |
| 2,794,757 | Bright | June 4, 1957 |

FOREIGN PATENTS

| | | |
|---|---|---|
| 801,271 | Great Britain | Sept. 10, 1958 |